United States Patent
Kanemaru (10) Patent No.: US 10,289,635 B2
(45) Date of Patent: May 14, 2019

(54) CONTROL APPARATUS AND CONTROL SYSTEM AGGREGATING WORKING DATA OF MANUFACTURING CELLS

(71) Applicant: FANUC CORPORATION, Yamanashi (JP)

(72) Inventor: Akira Kanemaru, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 145 days.

(21) Appl. No.: 15/463,570

(22) Filed: Mar. 20, 2017

(65) Prior Publication Data

US 2017/0277771 A1  Sep. 28, 2017

(30) Foreign Application Priority Data

Mar. 24, 2016  (JP) .................. 2016-059465

(51) Int. Cl.
*G06F 16/00* (2019.01)
*G06F 16/28* (2019.01)
(Continued)

(52) U.S. Cl.
CPC ..... *G06F 16/285* (2019.01); *G05B 19/41865* (2013.01); *G06F 7/02* (2013.01);
(Continued)

(58) Field of Classification Search
CPC .... G06F 16/285; G06F 7/02; G05B 19/41805
See application file for complete search history.

(56) References Cited

U.S. PATENT DOCUMENTS 4,365,273 A  12/1982  Yamada et al.
6,684,120 B1 *  1/2004  Oku ................. G06Q 10/06
                                            700/108
(Continued)

FOREIGN PATENT DOCUMENTS

CN       1851585 A    10/2006
CN     101316671 A    12/2008
(Continued)

OTHER PUBLICATIONS

Japanese Office Action dated Jan. 23, 2018, for Japanese Patent Application No. 2016-059465.
(Continued)

*Primary Examiner* — Tarek Chbouki
(74) *Attorney, Agent, or Firm* — Karceski IP Law, PLLC (57) ABSTRACT

There is provided a control apparatus including a receiving part that receives working data of manufacturing cells; a storage part that stores the working data; an item list generation part that classifies the working data for each of the components of each manufacturing cell, and extracts a data item to generate a data item list of a whole of each manufacturing cell; an integrated data generation part that compares a plurality of the data item lists, reads out detailed data of the data items having the same value from the working data stored in the storage part, and generates integrated data; an aggregated working data generation part that combines the integrated data and data other than the integrated data to generate aggregated working data; and a transmission part that externally transmits the aggregated working data.

6 Claims, 10 Drawing Sheets

(51) Int. Cl.
*G05B 19/418* (2006.01)
*G06F 7/02* (2006.01)

(52) U.S. Cl.
CPC .......... *G05B 2219/32258* (2013.01); *G05B 2219/36267* (2013.01); *Y02P 90/18* (2015.11); *Y02P 90/20* (2015.11)

(56) References Cited

U.S. PATENT DOCUMENTS

| | | | |
|---|---|---|---|
| 2005/0066241 A1* | 3/2005 | Gross | G05B 23/024 714/48 |
| 2009/0287342 A1 | 11/2009 | Hano | |
| 2012/0271587 A1* | 10/2012 | Shibuya | G05B 23/0229 702/127 |
| 2014/0288671 A1 | 9/2014 | Nojima | |
| 2015/0352724 A1 | 12/2015 | Nobuhara et al. | |
| 2016/0054718 A1 | 2/2016 | Nakagawa et al. | |

FOREIGN PATENT DOCUMENTS

| | | |
|---|---|---|
| CN | 105425743 A | 3/2016 |
| GB | 2066611 A | 7/1981 |
| JP | S56066971 | 6/1981 |
| JP | H04-240060 | 8/1992 |
| JP | H05135065 A | 1/1993 |
| JP | H050040507 A | 2/1993 |
| JP | H05-135065 A | 6/1993 |
| JP | H07056623 | 3/1995 |
| JP | H07116945 | 9/1995 |
| JP | H09131648 | 5/1997 |
| JP | H09-179904 | 7/1997 |
| JP | H09218707 | 8/1997 |
| JP | 2002304209 | 10/2002 |
| JP | 2005-321895 | 11/2005 |
| JP | 2009-009188 | 1/2009 |
| JP | 2012033071 | 2/2012 |
| JP | 2015231656 | 12/2015 |
| WO | 2010/074897 | 7/2010 |
| WO | 2015114821 A1 | 8/2015 |

OTHER PUBLICATIONS

Search Report by Registered Searching Organization for Japanese Patent Application No. 2016-059465 dated Jun. 7, 2018.

* cited by examiner

CONTROL APPARATUS AND CONTROL SYSTEM AGGREGATING WORKING DATA OF MANUFACTURING CELLS

CROSS-REFERENCE TO RELATED APPLICATIONS

This application is based on and relies for priority on Japanese Patent Application No. 2016-059465, filed Mar. 24, 2016, the entire contents of which are incorporated herein by reference.

FIELD OF THE INVENTION

The present invention relates to a control apparatus and a control system for managing a plurality of manufacturing cells.

BACKGROUND OF THE INVENTION

Generally, in a large-scale factory, a plurality of manufacturing cells that perform the same process exist, and the plurality of manufacturing cells are managed by a production planning apparatus connected through a communication network. In an individual manufacturing cell, machines such as a machine tool, a robot, and a PLC (Programmable Logic Controller), and a cell controller that is a control apparatus for controlling these are installed. The cell controller controls the individual machine in the manufacturing cell in accordance with a manufacturing instruction from the production planning apparatus, and performs monitoring of a work condition, collection of working data of the individual machine and the like at the same time. The collected working data is utilized for various management required for manufacturing such as process management, quality control, and safety management, in the cell controller or in the production planning apparatus after being transferred to the production planning apparatus.

Figure 10:
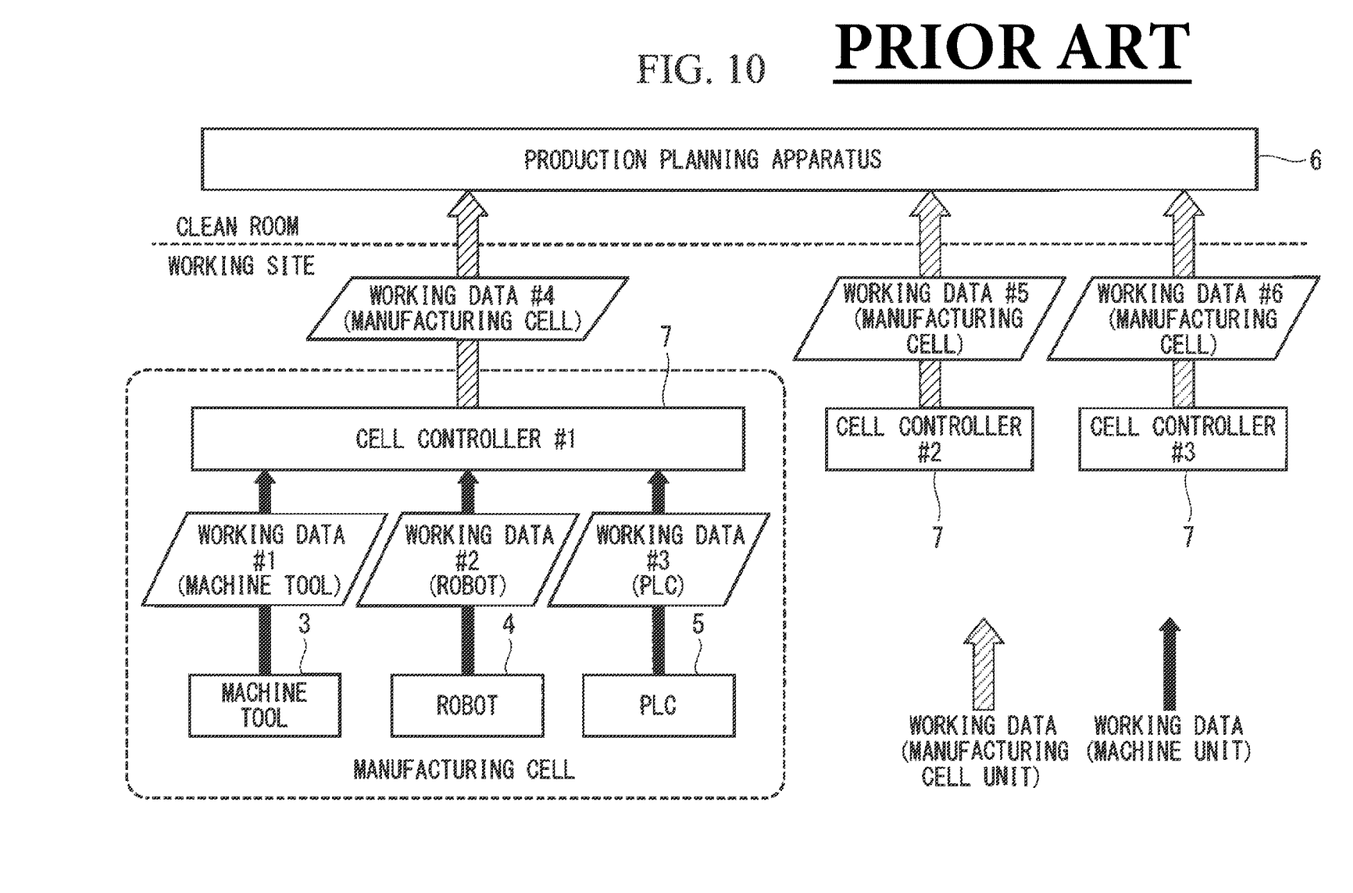
FIG. 10 is a block diagram illustrating a conventional example of a cell control system.

For example, as illustrated in FIG. 10, a cell controller 7 denoted by a cell controller #1 collects working data #1 to working data #3 for respective machines such as control information and event information from a machine tool 3, a robot 4 and a PLC 5 in the manufacturing cell, and working data #4 that is working data for each manufacturing cell unit obtained by putting these is transferred to a production planning apparatus 6. Similarly, cell controllers 7 denoted by a cell controller #2 and a cell controller #3 and installed parallel to the cell controller #1 transfers working data #5 and working data #6 to the production planning apparatus 6. Then, the production planning apparatus 6 analyzes a working situation of each manufacturing cell on the basis of the working data #4 to the working data #6 of the transferred manufacturing cell units, and performs optimum management of the manufacturing cell in accordance with production planning.

Recently, with increase in size of factories, for example, the number of manufacturing cells managed by the production planning apparatus is increased, and data collected from the individual manufacturing cell is diversified, so that data volume transferred from the cell controller to the production planning apparatus is significantly increased. As a result, a forwarding address of the working data collected by the individual cell controller is concentrated on the production planning apparatus, and problems such as increase in a network load, a shortage of processing capability of the production planning apparatus, and increase in response time are caused.

Furthermore, the above production planning apparatus is often installed in a clean room separated from a working site where the manufacturing cells are installed, and therefore it is difficult to analyze the working data transferred from the plurality of cell controllers at the working site, or to easily confirm a comparison result of the working data between the manufacturing cells, and the like, at the working site.

In view of such a situation, a technology of sharing the working data between the manufacturing cells and enhancing manufacturing efficiency without depending on the production planning apparatus is known.

Japanese Unexamined Patent Application, Publication No. 2015-231656 discloses a configuration in which data exchange between a plurality of robot control apparatuses and a record medium storing setting data of a robot control apparatus is possible by copying data of a selected item.

Japanese Unexamined Patent Application Publication No. Hei 7-116945 discloses a cell controller that collects measurement data of each working cell, grasps an operation condition of each working cell, and collectively manages the measurement data.

Japanese Unexamined Patent Application Publication No. Hei 7-56623 discloses a cell controller that changes schedules in manufacturing cells to enhance working efficiency when delay of setup work by an operator occurs.

Japanese Patent No. 2922032 discloses a configuration in which communication between manufacturing cells is performed, and determines priority work and the Japanese Patent No. 3275968 discloses a cell controller that changes data different in a format, which is collected from various apparatuses working in manufacturing cells, in accordance with a previously registered data format definition file.

SUMMARY OF THE INVENTION

A first aspect of the present invention is a control apparatus including: a receiving part that receives working data of manufacturing cells each including a plurality of components; a storage part that stores the working data; an item list generation part that classifies the working data for each of the components of each manufacturing cell, and extracts a data item from the working data classified for each of the components, to generate a data item list of a whole of each manufacturing cell; an integrated data generation part that compares a plurality of the data item lists generated from working data of a plurality of the manufacturing cells with each other, reads out detailed data of the data items having the same value from the working data stored in the storage part, and compares the detailed data with each other to generate integrated data obtained by putting together a matching point and a different point; an aggregated working data generation part that combines the integrated data and data other than the integrated data to generate aggregated working data obtained by aggregating a plurality of the working data; and a transmission part that externally transmits the aggregated working data.

A second aspect of the present invention is a control system including: the above control apparatus; and another control apparatus configured to transmit the working data of the manufacturing cells to the control apparatus.

DESCRIPTION OF EMBODIMENTS

Hereinafter, a master cell controller 1 and a cell control system 10 according to an embodiment of the present invention will be described with reference to the drawings.

Figure 1:
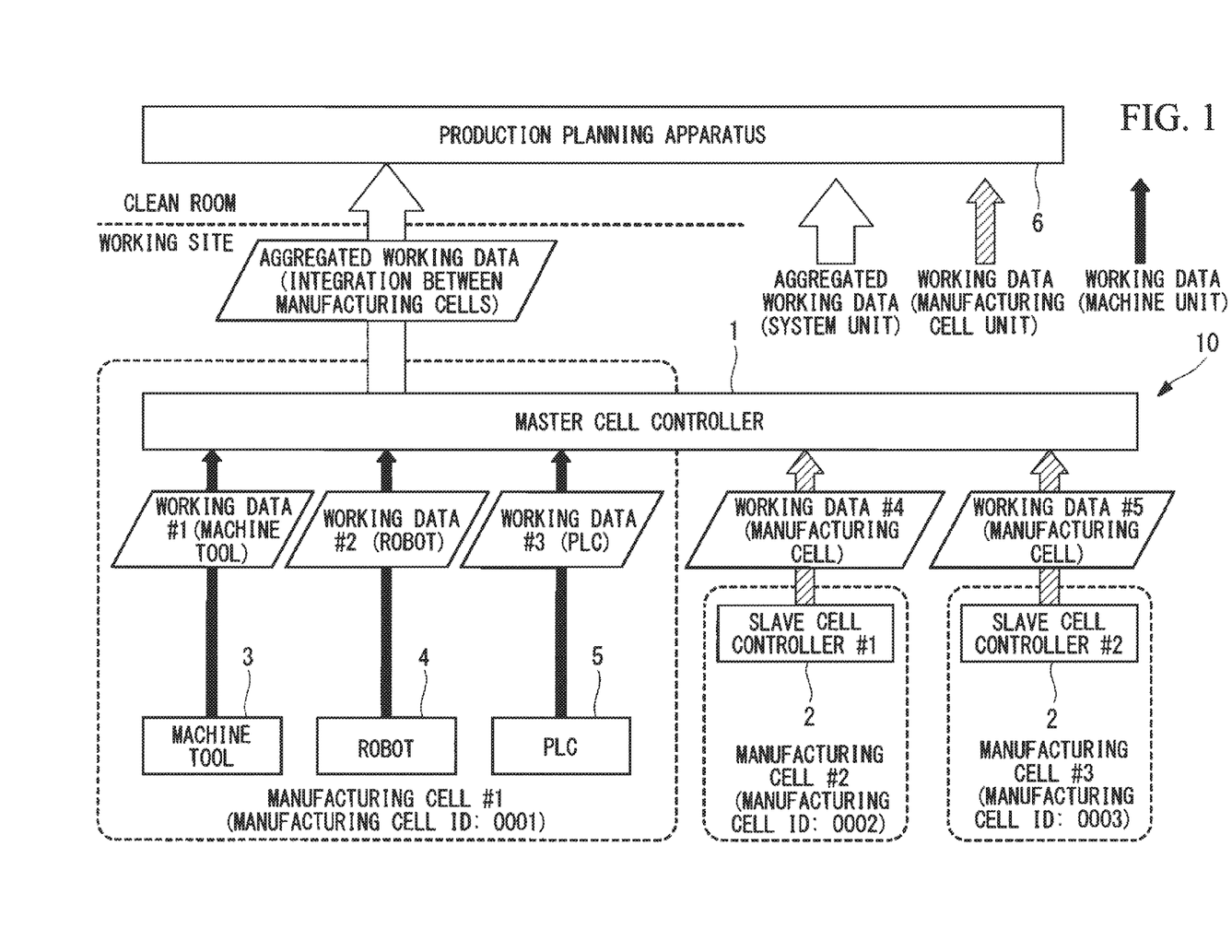
FIG. 1 is a block diagram illustrating a schematic configuration of a cell control system according to an embodiment of the present invention.

FIG. 1 is a block diagram illustrating a schematic configuration of the cell control system 10 according to this embodiment. The arrows with different thicknesses in FIG. 1 denote flow of three kinds of pieces of working data, and denote working data of a machine unit, working data of the manufacturing cell unit, and aggregated working data of a system unit in order from a thin arrow.

As illustrated in FIG. 1, the cell control system 10 includes a master cell controller 1 that functions as a master, slave cell controllers 2 denoted by a slave cell controller #1 and a slave cell controller #2 that function as slaves. In this embodiment, the cell control system 10 is installed at a working site separated from a clean room where a production planning apparatus 6 for performing management required for manufacturing is installed.

The master cell controller 1 is a control apparatus that controls machines (components) such as the machine tool 3, the robot 4, and the PLC 5 provided in a manufacturing cell #1. Although not illustrated, the slave cell controller #1 and the slave cell controller #2 similarly control respective pluralities of machines included in a manufacturing cell #2 and a manufacturing cell #3.

Although the two slave cell controllers 2 are illustrated in FIG. 1, the cell control system 10 according to this embodiment actually includes the three or more slave cell controllers 2.

The slave cell controllers 2 each only need to output working data of the manufacturing cell controlled, and each may have an inner configuration identical with an inner configuration of the master cell controller 1 described below.

Figure 2:
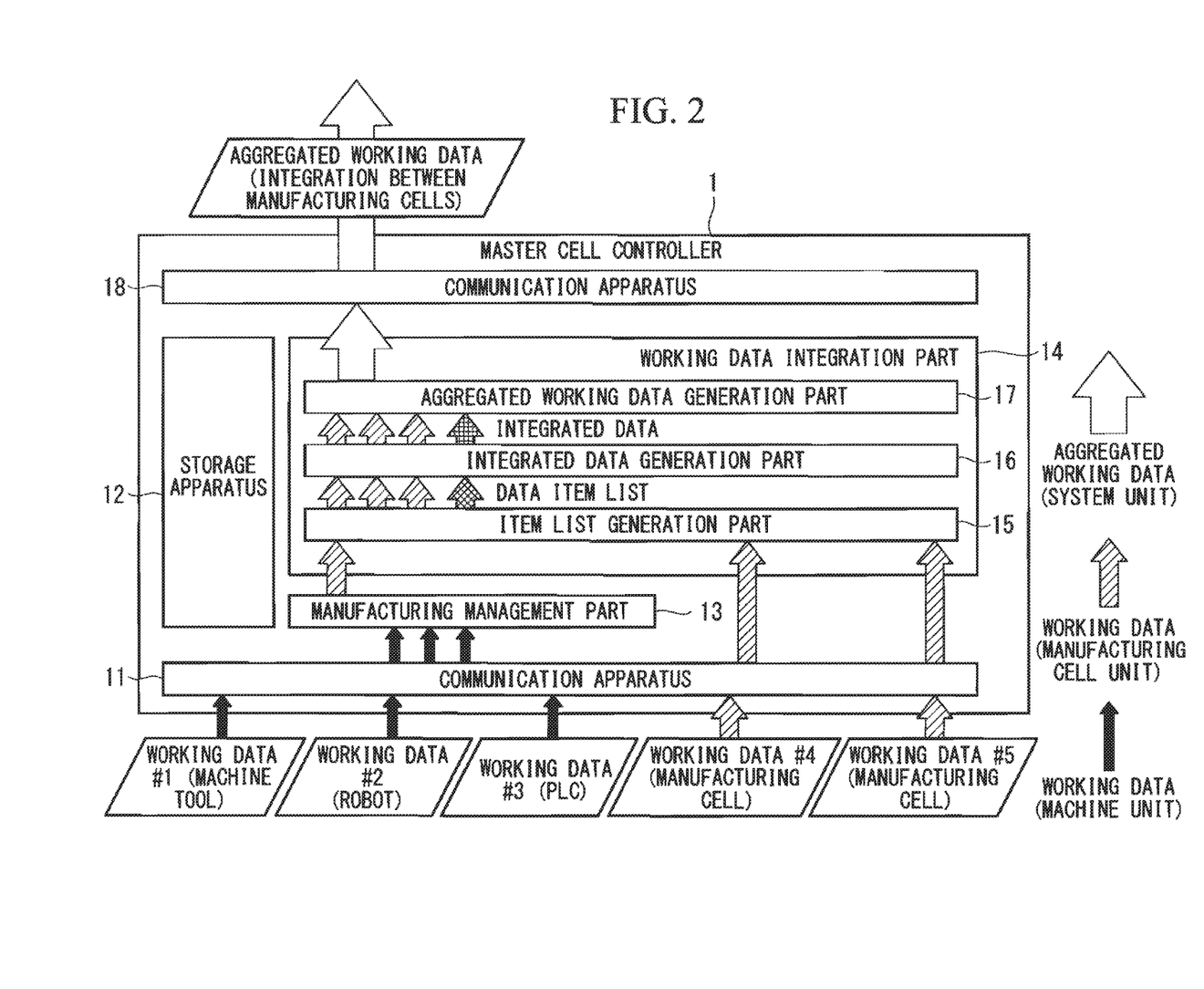
FIG. 2 is a block diagram illustrating a schematic configuration of a master cell controller configuring the cell control system in FIG. 1.

As illustrated in FIG. 2, the master cell controller 1 according to this embodiment includes a communication apparatus (receiving part) 11, a storage apparatus (storage part) 12, a manufacturing management part 13, a working data integration part 14, and a communication apparatus (transmission part) 18.

The communication apparatus 11 is configured so as to receive the working data #1 to the working data #3 of the machine unit and the working data #4 to the working data #5 of the manufacturing cell unit.

The manufacturing management part 13 is configured so as to generate the working data of the manufacturing cell unit on the basis of the working data #1 to the working data #3 of the machines provided in the manufacturing cell #1 controlled by the master cell controller 1.

The working data integration part 14 has an item list generation part 15, an integrated data generation part 16, and an aggregated working data generation part 17, and is configured so as to generate the aggregated working data of the system unit on the basis of the working data generated in the manufacturing management part 13 and the working data #4 and the working data #5 received by the communication apparatus 11.

The communication apparatus 18 is configured so as to transfer the aggregated working data generated in the working data integration part 14 to a display apparatus (not illustrated) connected to the external production planning apparatus 6 and the master cell controller 1 through a communication network.

In FIG. 2, the flow of the working data is schematically illustrated by use of the arrows with different thicknesses. However, the storage apparatus 12 actually exchanges various data with the communication apparatuses 11, 18, the manufacturing management part 13 and the working data integration part 14 through buses (not illustrated).

Actions of the master cell controller 1 and the cell control system 10 thus configured, according to this embodiment will be hereinafter described.

Processes in the master cell controller 1, described below, are performed in synchronization with data request from the production planning apparatus 6 or the display apparatus and a transmission event from each slave cell controller 2.

Hereinafter, processes performed in the item list generation part 15 will be described with reference to FIG. 3 and FIG. 4.

Figure 3:
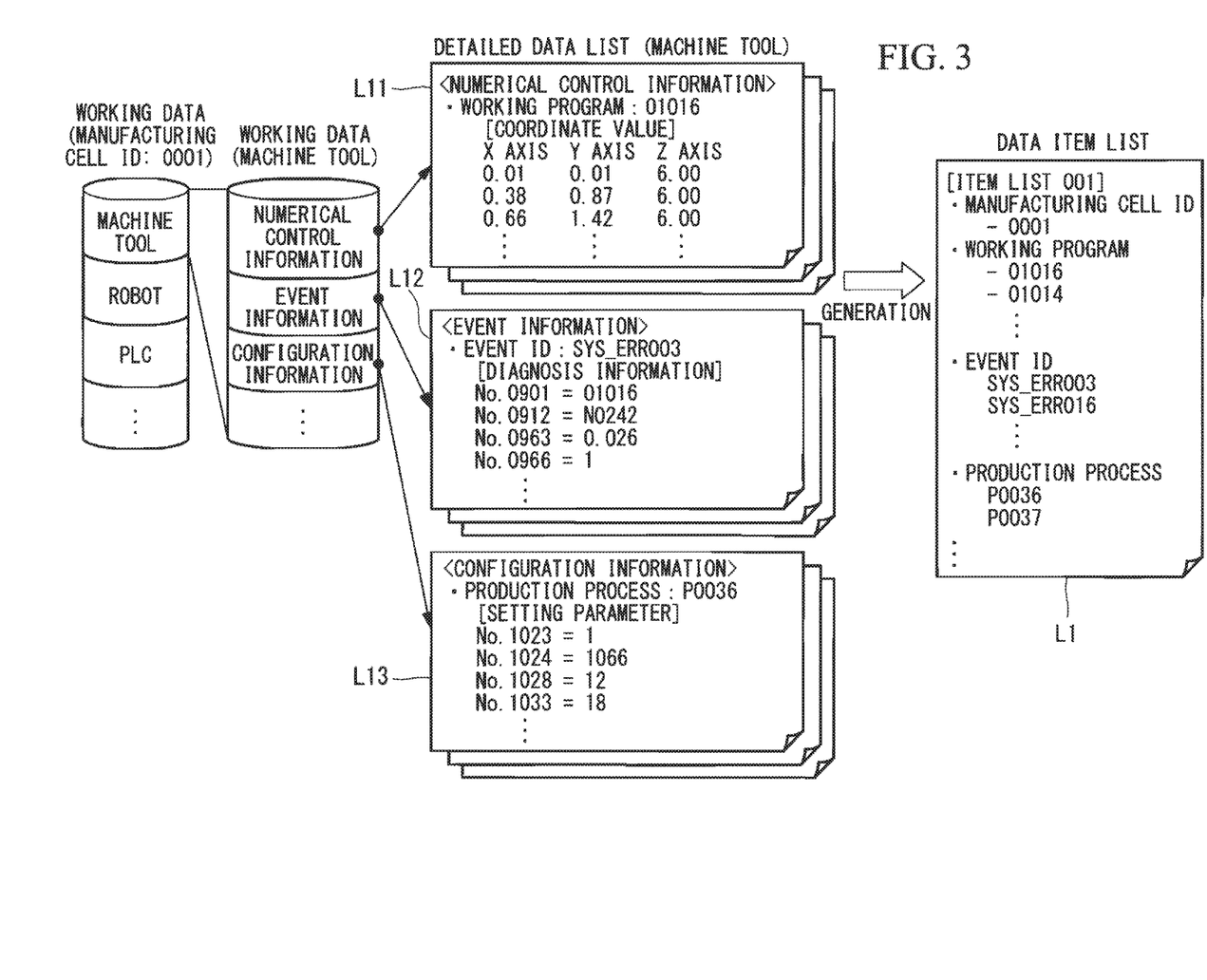
FIG. 3 is a diagram for illustrating an example of data item list generation in an item list generation part.
Figure 4:
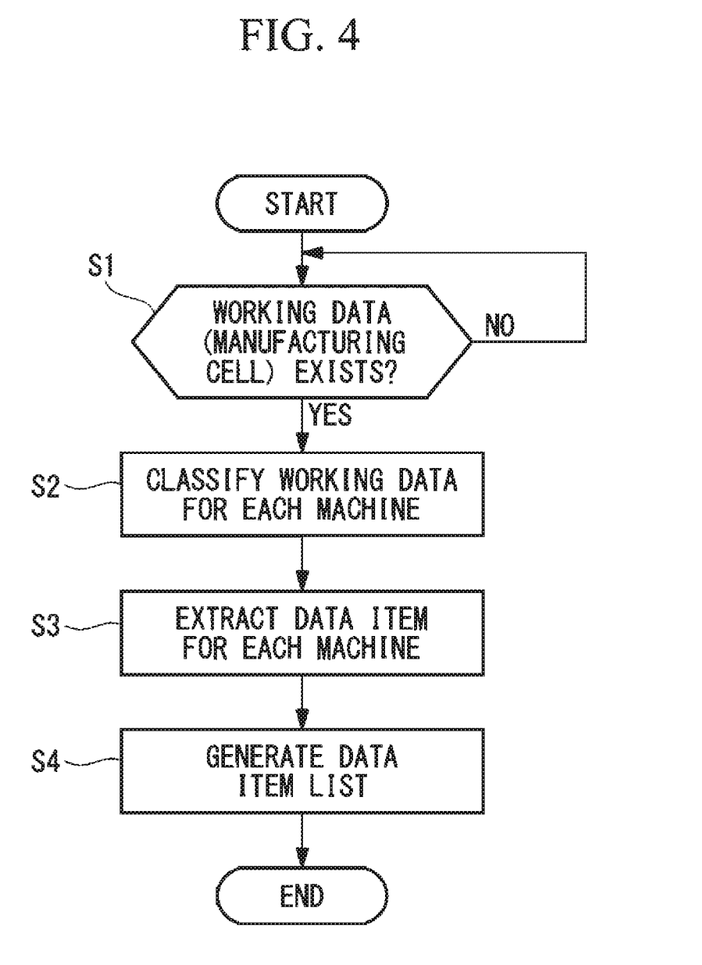
FIG. 4 is a flowchart illustrating processes performed in the item list generation part.

FIG. 3 is a diagram for illustrating an example of data item list generation in the item list generation part 15 of the master cell controller 1 according to this embodiment, and FIG. 4 is a flowchart illustrating the processes performed in the item list generation part 15.

First, the item list generation part 15 determines whether or not working data to be processed is the working data of the manufacturing cell unit (Step S1 in FIG. 4). Then, when the item list generation part 15 determines that the working data to be processed is the working data of the manufacturing cell unit, the working data is classified for each machine provided in the manufacturing cell (Step S2 in FIG. 4). In the example illustrated in FIG. 3, working data of the manufacturing cell #1 identified by manufacturing cell ID: 0001 is classified into respective pieces of working data of the machine tool, the robot, the PLC, and the like.

Then, data items are extracted from the working data classified for each machine (Step S3 in FIG. 4). In the example illustrated in FIG. 3, numerical control information, event information and configuration information, and the like are included in the classified working data of the machine tool.

As illustrated in FIG. 3, the numerical control information of the machine tool includes a detailed data list L11, which includes a "working program" as the data item, "O1016" as a value of the data item, and coordinate value data as the detailed data.

The event information of the machine tool includes a detailed data list L12, which includes "event ID" as the data item, "SYS_ERR003" as a value of the data item, and diagnostic information data as the detailed data.

The configuration information of the machine tool includes a detailed data list L13, which includes a "production process" as the data item, "P0036" as a value of the data item, and a setting parameter as the detailed data.

Similarly, the working data of each of the machines such as the robot and the PLC provided in the manufacturing cell #1 includes numerical value information, event information, configuration information, and the like.

In Step S3, data items and values of these, namely, "working program: O1016", "event ID: SYS_ERR003", and "production process: P0036" are extracted from the working data of the machine tool. Similarly, in the robot, the PLC and the like in the manufacturing cell, the data items and the values of these are extracted.

Thereafter, as illustrated in FIG. 3, the extracted data items and the values of these are aligned per data item, so that a data item list L1 identified as an item list 001 is generated (Step S4 in FIG. 4).

In addition to the extracted data items and the extracted values of these, the data item list L1 includes manufacturing cell ID for identifying the manufacturing cell so as to be able to determine which manufacturing cell the data item list corresponds to.

Although not illustrated, the data item list L1 includes an address on the storage apparatus 12 storing the detailed data, corresponding to the value of each data item, so as to be able to easily refer the detailed data stored in the storage apparatus 12. In place of the addresses on the storage apparatus 12, the data item list L1 may include link information for reading the detailed data.

Now, processes performed in the integrated data generation part 16 will be described with reference to FIG. 5 to FIG. 7.

Figure 5:
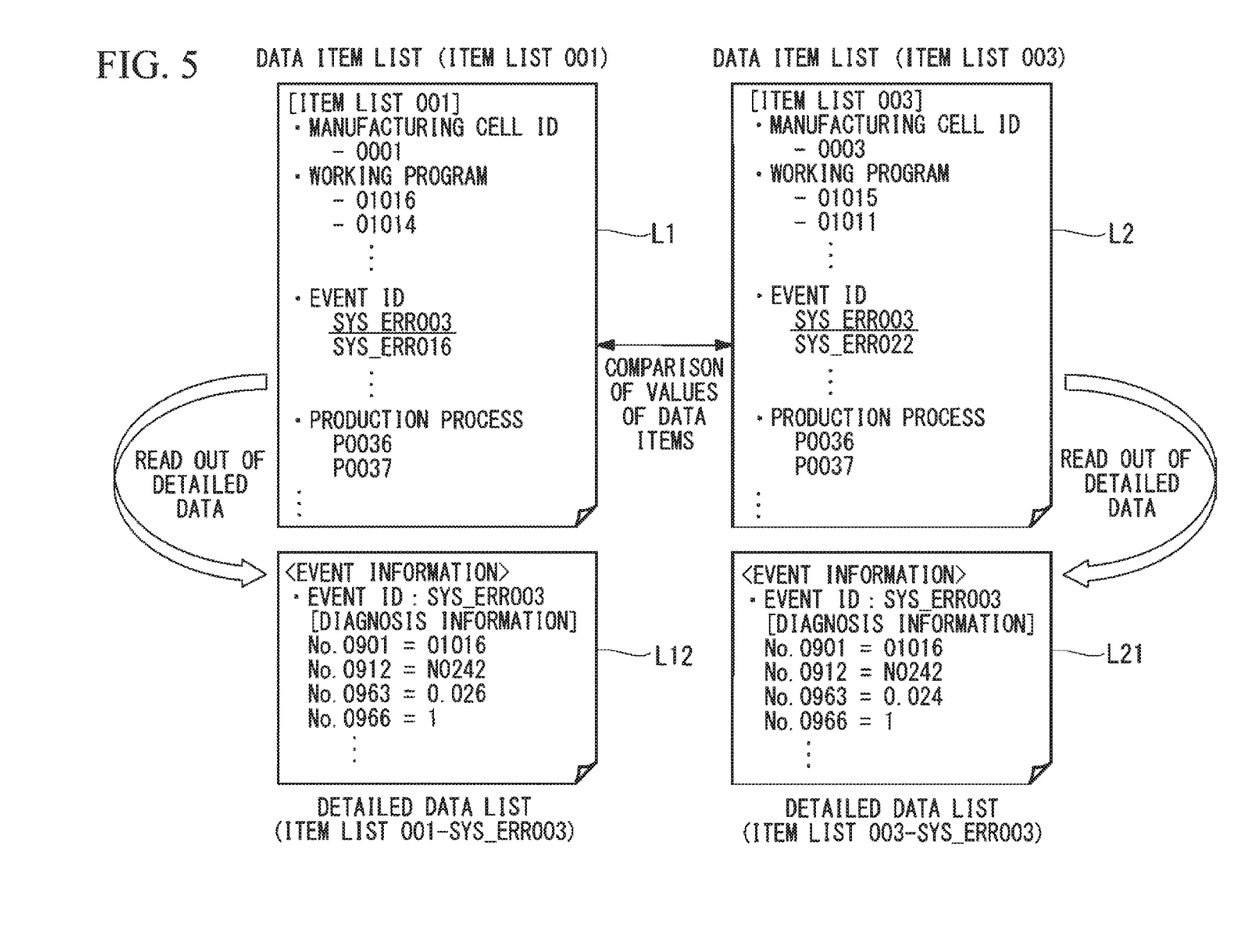
FIG. 5 is a diagram for illustrating an example of read of detailed data in the integrated data generation part.
Figure 6:
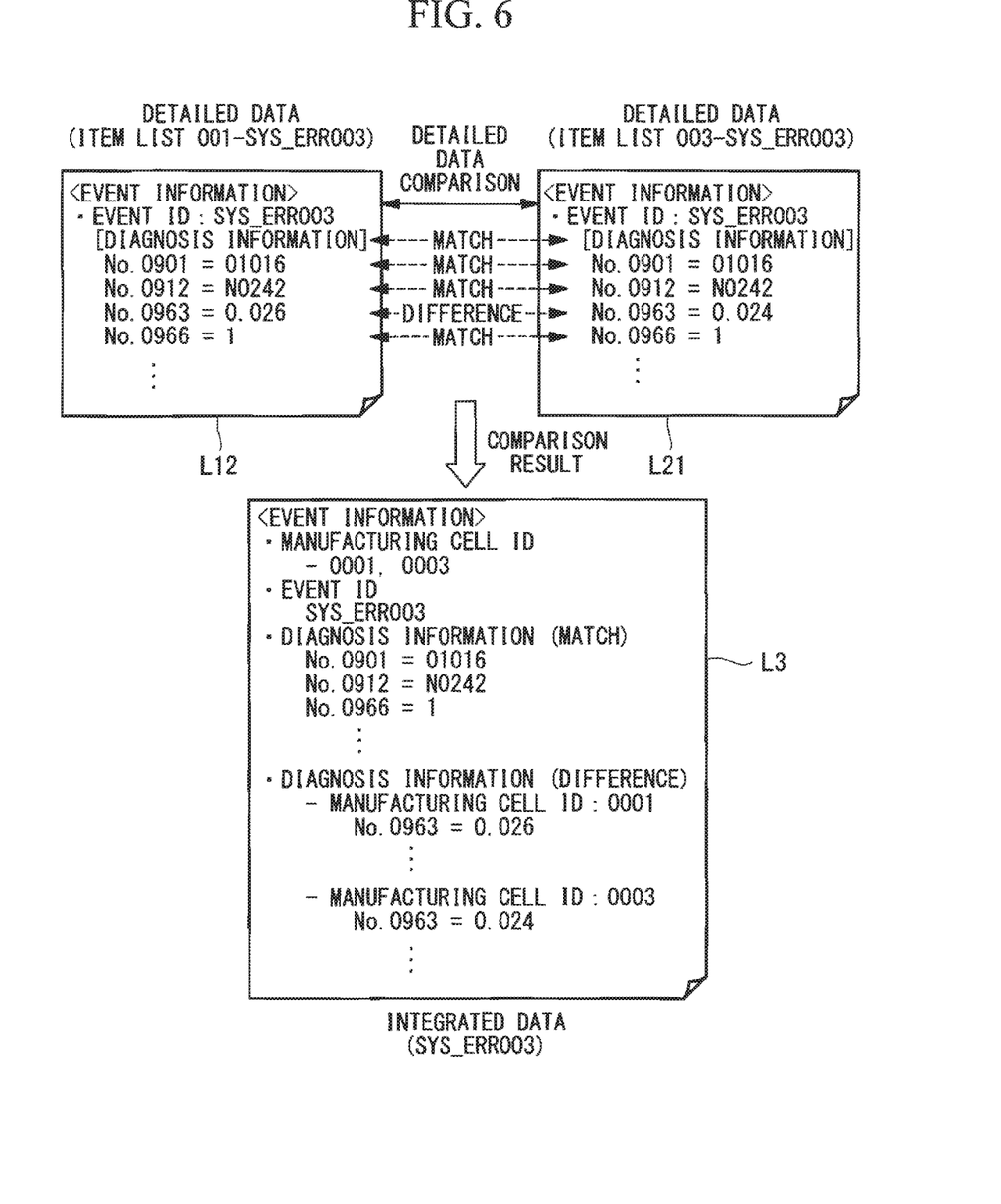
FIG. 6 is a diagram for illustrating an example of a procedure for generating integrated data from the detailed data in the integrated data generation part.

FIG. 5 is a diagram for illustrating an example of read of the detailed data in the integrated data generation part 16, and FIG. 6 is a diagram for illustrating an example of a procedure for generating integrated data from the detailed data in the integrated data generation part 16. FIG. 7 is a flowchart illustrating processes performed in the integrated data generation part 16.

Figure 7:
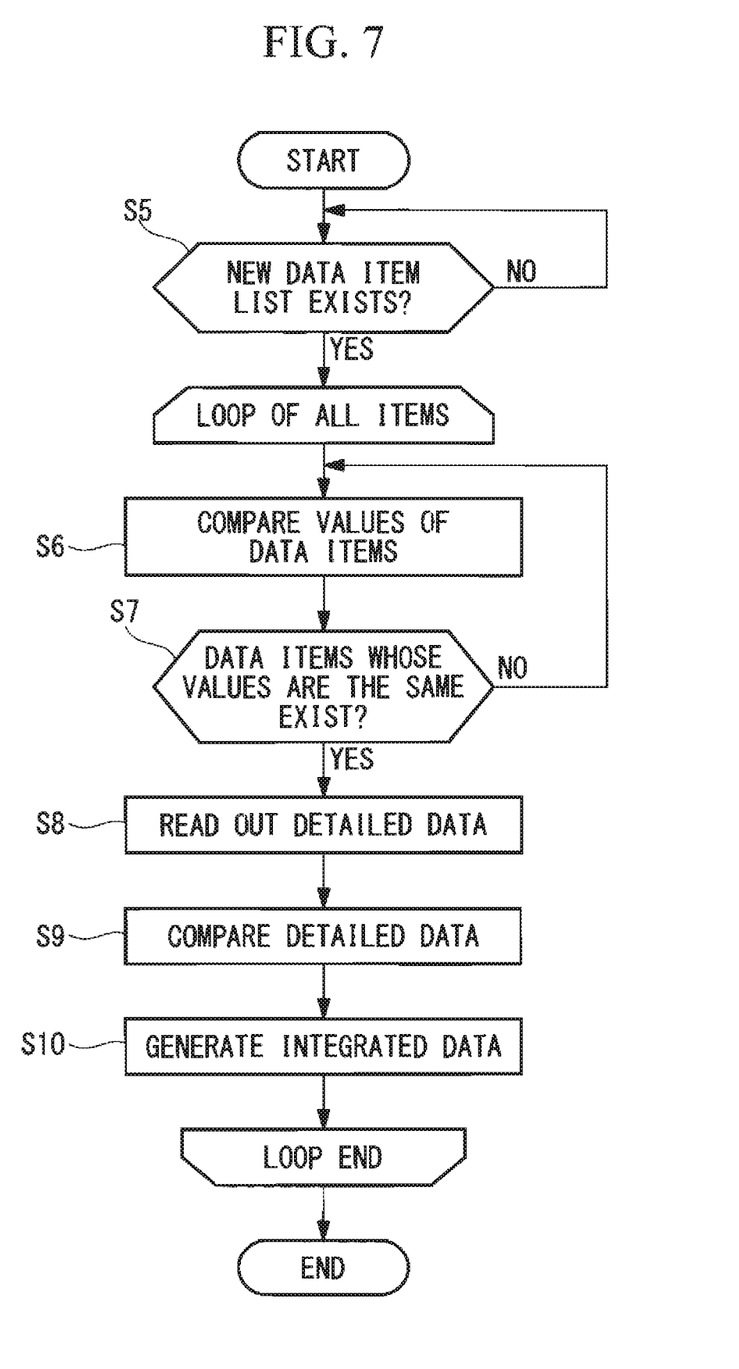
FIG. 7 is a flowchart illustrating processes performed in the integrated data generation part.

First, the integrated data generation part 16 checks whether or not a new data item list exists in the storage apparatus 12 (Step S5 in FIG. 7). Then, when the integrated data generation part 16 determines that the new data item list exists in the storage apparatus 12, values of data items in all items of the existing data item list are compared with values of data items in all items of the new data item list (Step S6 in FIG. 7).

In the example illustrated in FIG. 5, the existing data item list L1 identified as the item list 001 is compared with a new data item list L2 identified as an item list 003.

As a result of the comparison of the existing data item list L1 with the new data item list L2, in a case where there are data items whose values are the same (Step S7 in FIG. 7), detailed data corresponding to the value of the data item is further read out from the storage apparatus 12 (Step S8 in FIG. 7).

In the example illustrated in FIG. 5, value "SYS_ERR003" of the data item "event ID" in the data item list L1 and value "SYS_ERR003" of the data item "event ID" in the data item list L2 are the same, and therefore detailed data corresponding to this is further read out from the storage apparatus 12.

Then, comparison of the detailed data is performed (Step S9 in FIG. 7). In FIG. 6, the detailed data in the detailed data list L12 identified as item list 001-SYS_ERR003 is compared with detailed data in a detailed data list L21 identified as item list 003-SYS_ERR003 for each record.

Then, integrated data is generated on the basis of a comparison result (Step S10 in FIG. 7). In the integrated data, the manufacturing cell ID of the compared manufacturing cell, the compared data items, records of the matching detailed data, and the records of the different detailed data are recorded.

In the example illustrated in FIG. 6, record "No. 0963=0.026" of the detailed data included in the detailed data list L12 is different from record "No. 0963=0.024" of the detailed data included in the detailed data list L21, and therefore these different records are recorded as data item "diagnosis information (difference)" in the integrated data identified as SYS_ERR003. On the other hand, matching records are collected into one to be recorded as data item "diagnosis information (match)".

Thus, as to the matching records, two records are compressed as one record to be recorded, and therefore data volume is halved.

In the integrated data generation part 16, a predetermined error range can be set. Consequently, when the records are compared, and match or difference is determined, not only in a case where the both completely match, but also in a case where the both are included in the predetermined error range, it is determined that an error is allowed, and the both match each other.

Additionally, the integrated data generation part 16 generates integrated data including ratios of the matching records and the different records to the whole in order to easily grasp how much the data volume is compressed.

Figure 8:
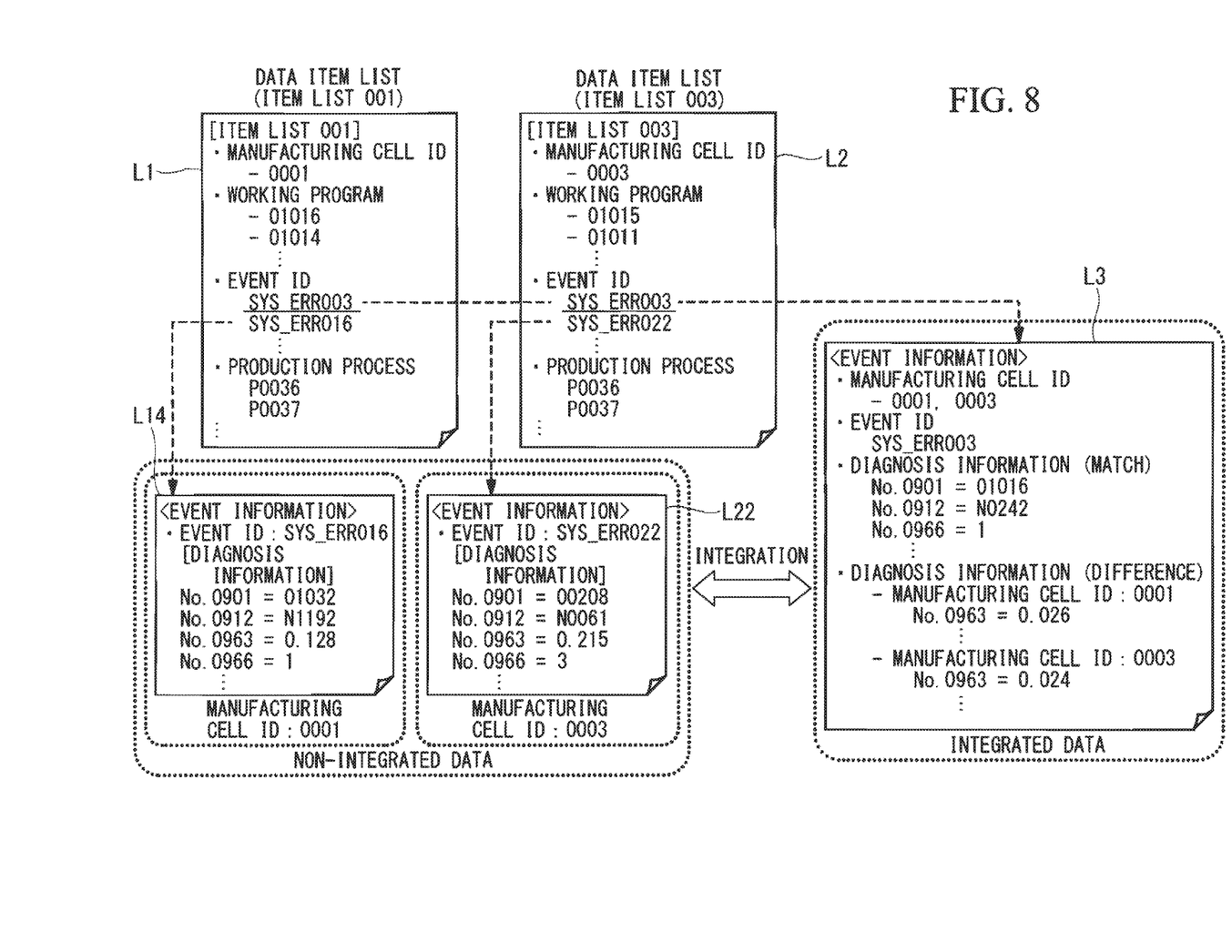
FIG. 8 is a diagram for illustrating an example of a procedure for generating aggregated working data in an aggregated working data generation part.

Now, processes performed in the aggregated working data generation part 17 will be described with reference to FIG. 8 and FIG. 9. FIG. 8 is a diagram for illustrating an example of a procedure for generating aggregated working data in the aggregated working data generation part 17, and FIG. 9 is a flowchart illustrating the processes performed in the aggregated working data generation part 17.

Figure 9:
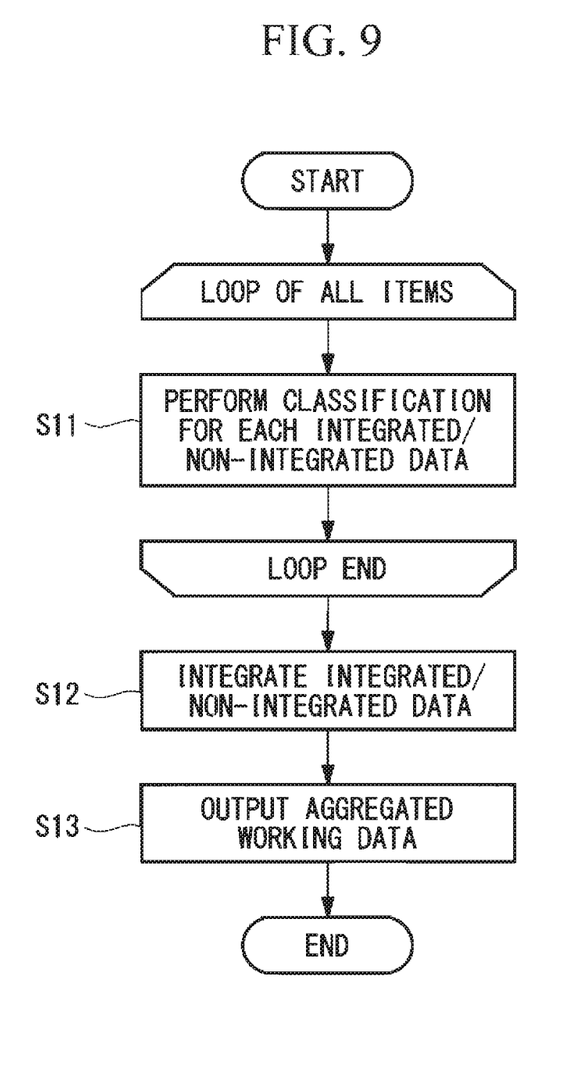
FIG. 9 is a flowchart illustrating processes performed in the aggregated working data generation part.

First, pieces of data in all items of the new data item list L2 are classified into the integrated data and non-integrated data other than the integrated data (Step S11 in FIG. 9). In the example illustrated in FIG. 8, SYS_ERR003 of the event ID and P0036 and P0037 of the production process are the same in the values of the data items, and therefore are classified as the integrated data, and other data items are classified as the non-integrated data. For example, SYS_ERR016 and SYS_ERR022 which are different in the values of the event ID are classified as the non-integrated data.

Thereafter, in the example illustrated in FIG. 8, integrated data L3 having compressed working data, and the non-integrated data including detailed data lists L14 and L22 having uncompressed working data are integrated, so that aggregated working data as working data of the whole system is generated (Step S12 in FIG. 9), and the aggregated working data is transmitted to the production planning apparatus 6 and the display apparatus (not illustrated) installed at the working site (Step S13 in FIG. 9).

In the above embodiment, the aggregated working data is generated from the two data item lists. However, in a case where the aggregated working data is generated from three or more data item lists, the aggregated working data may be generated by comparing all data item lists at the same time, or the aggregated working data may be generated by sequentially comparing two data item lists similarly to the above embodiment.

Thus, the aggregated working data of the whole system compressed in the master cell controller 1 is transmitted to the production planning apparatus 6 and the display apparatus, and therefore data volume in data exchange between the master cell controller 1, and the production planning apparatus 6 and the display apparatus can be reduced as much as possible, compared to a case where the uncompressed working data of the manufacturing cell unit is transmitted from the individual cell controller.

The master cell controller 1 has the working data of the manufacturing cells controlled by the slave cell controllers 2, and holds data obtained by putting together matching points and different points of the working data between the manufacturing cells, and therefore it is possible to easily confirm the analysis and comparison result of the working data between the plurality of manufacturing cells.

As described above, the embodiment of the present invention is described in detail with reference to the drawings. However, the specific configuration is not limited to these embodiments, and includes design change and the like without departing from the scope of the present invention.

For example, in place of the master cell controller 1, a control apparatus such as a host computer having a similar function may be employed. Additionally, a control apparatus such as a host computer including cell controllers which do not function as masters and slaves and are disposed in parallel, and installed between the cell controllers and the production planning apparatus may be employed.

As a result, the above-described embodiment leads to the following aspects.

A first aspect of the present invention is a control apparatus including: a receiving part that receives working data of manufacturing cells each including a plurality of components; a storage part that stores the working data; an item list generation part that classifies the working data for each of the components of each manufacturing cell, and extracts a data item from the working data classified for each of the components, to generate a data item list of a whole of each manufacturing cell; an integrated data generation part that compares a plurality of the data item lists generated from working data of a plurality of the manufacturing cells with each other, reads out detailed data of the data items having the same value from the working data stored in the storage part, and compares the detailed data with each other to generate integrated data obtained by putting together a matching point and a different point; an aggregated working data generation part that combines the integrated data and data other than the integrated data to generate aggregated working data obtained by aggregating a plurality of the working data; and a transmission part that externally transmits the aggregated working data.

According to the control apparatus of the first aspect, the working data of the manufacturing cell is received by the receiving part to be stored in the storage part. The item list generation part classifies the working data of the manufacturing cell for each of the components, and extracts a data item from each working, to generate the data item list of the whole of the manufacturing cell. When the plurality of data item list are generated from the working data of the plurality of manufacturing cells, the integrated data generation part compares the plurality of data item lists with each other. In a case where the values of the compared data items are the same, the integrated data generation part reads out the detailed data corresponding to the data items from the working data stored in the storage part, and compares the read detailed data to generate the integrated data obtained by aggregating the matching point and the different point. Then, aggregated working data generation part combines the integrated data and the data other than the integrated data, and the transmission part externally transmits the aggregated working data.

Consequently, in a case where one parts of the respective pieces of the working data of the manufacturing cells match each other, the respective one parts of the pieces of the working data are integrated as the matching point in the integrated data, so that data volume can be reduced. As a result, it is possible to prevent increase in a network load between a cell controller and a production planning apparatus, a shortage of processing capability of the production planning apparatus, and increase in response time.

Additionally, the matching point and the different point are put together on the integrated data, and therefore the matching point and the different point of the working data between the plurality of manufacturing cells can be easily confirmed, and cause investigation of working failure, determination of component replacement, and the like can be promptly performed at a manufacturing site.

In the control apparatus according to the above first aspect, the data item list each may include at least one of an ID for identifying each manufacturing cell, numerical control information of the components installed in each manufacturing cell, event information, and configuration information.

In the control apparatus according to the above first aspect, the data item list each may include an address of the detailed data stored in the storage part or link information for reading out the detailed data.

In the control apparatus according to the above first aspect, the integrated data generation part may be capable of setting an error range as a standard for determining the matching point and the different point.

In the control apparatus according to the above first aspect, the integrated data generation part may generate the integrated data including ratios of the matching point and different point.

A second aspect of the present invention is a control system including: the above control apparatus; and another control apparatus configured to transmit the working data of the manufacturing cells to the control apparatus.

The present invention exerts effects capable of reducing data volume of working data of a plurality of manufacturing cells transmitted externally as much as possible to reduce a network load, and easily confirming analysis and comparison results of the working data between the plurality of manufacturing cells.

The invention claimed is:

1. A control apparatus, comprising:
a receiving part, as a part of a master controller adapted to communicate with a production planning apparatus, that receives working data of at least two manufacturing cells, each of the at least two manufacturing cells including a plurality of components;
a storage part, in communication with the receiving part, that stores the working data;
an item list generation part, in communication with the receiving part and the storage part, that classifies the working data for each of the components of each of the at least two manufacturing cells, extracts at least one data item from the working data classified for each of the components, and generates an existing data item list for each of the at least two manufacturing cells;
an integrated data generation part, in communication with the item list generation part and the storage part, that determines if a new data item list exists in the storage part, compares the existing data item list with the new data item list when it is determined that the new data item list exists in the storage part, reads out detailed data of those data items having the same value from the working data stored in the storage part, and compares the detailed data in the existing data item list with detailed data in the new data item list to generate integrated data obtained by putting together a matching point and a different point;

an aggregated working data generation part, in communication with the integrated generation part and the storage part, that combines the integrated data and data other than the integrated data to generate aggregated working data; and a transmission part that externally transmits the aggregated working data from the master controller, wherein a storage size of the aggregated working data is smaller than a combined storage size of the existing data item list and the new data item list.

2. The control apparatus according to claim 1, wherein the existing data item list and the new data item list each include at least one of an ID for identifying each of the at least two manufacturing cells, numerical control information of the plurality of components installed in the at least two manufacturing cells, event information, and configuration information.

3. The control apparatus according to claim 1, wherein the existing data item list and the new data item list include an address of the detailed data stored in the storage part or link information for reading out the detailed data.

4. The control apparatus according to claim 1, wherein the integrated data generation part is adapted to set an error range for determining the matching point and the different point.

5. The control apparatus according to claim 1, wherein the integrated data includes ratios of the matching point and the different point.

6. A control system, comprising:

a control apparatus comprising:
- a receiving part, as a part of a master controller adapted to communicate with a production planning apparatus, that receives working data of at least two manufacturing cells, each of the at least two manufacturing cells including a plurality of components;
- a storage part, in communication with the receiving part, that stores the working data;
- an item list generation part, in communication with the receiving part and the storage part, that classifies the working data for each of the components of each of the at least two manufacturing cells, extracts at least one data item from the working data classified for each of the components, and generates an existing data item list for each of the at least two manufacturing cells;
- an integrated data generation part, in communication with the item list generation part and the storage part, that determines if a new data item list exists in the storage part, compares the existing data item list with the new data item list when it is determined that the new data item list exists in the storage part, reads out detailed data of those data items having the same value from the working data stored in the storage part, and compares the detailed data in the existing data item list with detailed data in the new data item list to generate integrated data obtained by putting together a matching point and a different point;
- an aggregated working data generation part, in communication with the integrated generation part and the storage part, that combines the integrated data and data other than the integrated data to generate aggregated working data;
- a transmission part that externally transmits the aggregated working data from the master controller,
- wherein a storage size of the aggregated working data is smaller than a combined storage size of the existing data item list and the new data item list; and another control apparatus configured to transmit the working data of the at least two manufacturing cells to the control apparatus.

* * * * *